United States Patent Office 2,766,246
Patented Oct. 9, 1956

2,766,246

ACYCLIC, POLYNITRILE-CONTAINING, UNSATURATED COMPOUNDS AND PREPARATION THEREOF

William Joseph Middleton, Wilmington, Del., assignor to E. I. du Pont de Nemours and Company, Wilmington, Del., a corporation of Delaware No Drawing. Application April 15, 1955,
Serial No. 501,711

11 Claims. (Cl. 260—286)

This invention is concerned with an acyclic, polynitrile-containing, unsaturated compound which is a strong, water-soluble, dihydric organic acid and its salts, and methods for preparing these compounds; and more particularly with the compound 2-dicyanomethylene-1,1,3,3-tetracyanopropane, salts of this acid with cations of inorganic or organic bases, and preparation of the acid and its salts.

Most acidic organic compounds are characterized by limited capacity for dissociation in water so that their aqueous acid strengths are much lower than those of the inorganic mineral acids. This may be readily expressed in terms of the pKa of the acid, the pKa being the negative logarithm of the dissociation constant of the acid. Thus, the pKa values for the common monobasic organic acids (formic, acetic, propionic, etc.) in water lie in the range of 3–5 and even an exception such as trichloroacetic acid has a pKa (0.7) which is at least measurable in water. In contrast, the common mineral acids, such as hydrochloric acid, nitric acid and the first hydrogen of sulfuric acid, are so highly dissociated that pKa determination by ordinary means in water is impossible. An organic acid of similar strength which is also a dihydric acid should open up valuable new fields of organic chemistry.

It is an object of this invention to provide a new organic acid, which is a water-soluble, dihydric acid and has a strength comparable to that of mineral acids. Another object is to provide salts of the acid which have unusual and valuable properties. A further object is to provide methods for preparing the acid and its salts. Other objects of the invention will become apparent from the specification and claims.

In accordance with this invention there has been discovered a new class of chemical compounds, 2-dicyanomethylene-1,1,3,3-tetracyanopropane and its salts, and a process for their preparation by reacting a dicyanoketene acetal with two molecular equivalents of sodiomalononitrile, the reaction preferably being carried out in an inert organic liquid medium.

2-dicyanomethylene-1,1,3,3-tetracyanopropane is a difunctional organic acid characterized by high water solubility. Aqueous solutions of this acid are so strongly acidic that the pKa of the first hydrogen cannot be determined by ordinary means. Its acid strength is fully comparable to that of sulfuric acid. The anion of this highly acidic compound is composed entirely of carbon and nitrogen.

The acid readily forms salts with inorganic cations, amine cations and trialkylsulfonium cations. For convenience in naming the salts of this invention, the divalent anion which remains after removal of the protons from positions 1 and 3 in 2-dicyanomethylene-1,1,3,3-tetracyanopropane has been designated as the 2-dicyanomethylene-1,1,3,3-tetracyanopropane-1,3-diide ion. The salts form characteristic crystals, the salts of polyvalent metals forming crystalline hydrates. The cupric salt is useful as a maroon pigment.

The salts of 2-dicyanomethylene-1,1,3,3-tetracyanopropane exhibit strong cathode and ultraviolet light luminescence and, therefore, are highly useful as phosphors. This is in sharp contrast with the corresponding salts of 1,1,3,3-tetracyanopropane, which exhibit little or no such luminescence.

The reaction of the acetals (including cyclic acetals and thioacetals) of dicyanoketene with two molecular equivalents of sodiomalononitrile to yield the disodium salt of 2-dicyanomethylene-1,1,3,3-tetracyanopropane may be represented by the following equation:

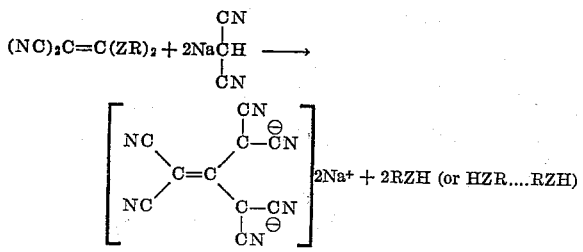

where Z represents a chalcogen of atomic weight less than 33, i. e., oxygen or sulfur, and R represents an alkyl radical, both R's being taken together to represent a bivalent hydrocarbon radical in the case of cyclic acetals.

Anhydrous conditions are not essential for carrying out this reaction. However, since water is not inert with respect to the reactants, the presence of large quantities of water, e. g., a one-half molar equivalent amount or more, leads to substantial reductions in yield through side reactions. It is, therefore, better to carry out the reaction in an inert organic liquid medium, solvents for the reactants such as an alcohol, an ether or a liquid hydrocarbon being preferred.

In a preferred embodiment of this invention, separate alcohol solutions of a dicyanoketene acetal and sodiomalononitrile are mixed. The exothermic reaction which ensues is controlled by external cooling. When the reaction has subsided, there remains an alcohol solution of sodium 2 - dicyanomethylene - 1,1,3,3 - tetracyanopropane-1,3-diide. The sodium derivative is isolated by evaporation of the solvent. The crystalline sodium salt is readily soluble in water. The free acid is formed by treating a solution of a metal salt of the acid with an anion, which removes the metal cation as an insoluble compound, as by passing an aqueous solution of the salt through a cation exchange column which is in acid form, or by precipitating the cation as an insoluble salt with an acid. For example, an aqueous solution of the barium salt of the acid may be treated with sulfuric acid equivalent to the barium ion present to form insoluble barium sulfate, which can then be removed by filtering the solution.

Dicyanoketene acetals may be prepared by the reaction of tetracyanoethylene and alcohols in the presence of a catalyst, such as urea, a tertiary amine or a metal salt.

In the following examples, which illustrate embodiments of the invention but are not to be construed as limitative, parts are by weight except where otherwise indicated.

EXAMPLE I

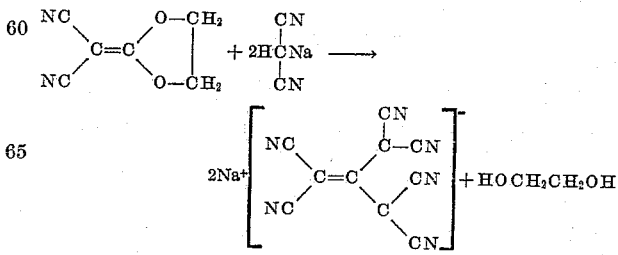

A solution of 68 parts of dicyanoketene ethylene acetal in 197 parts of hot ethyl alcohol is added to an alcohol solution of sodiomalononitrile prepared by adding 66 parts of malononitrile and 23 parts of sodium to 395 parts of ethyl alcohol. An exothermic reaction ensues and the reaction mixture is cooled in ice. The clear reaction mixture is filtered, and the filtrate is mixed with 2854 parts of ether. The white precipitate which forms is collected on a filter, washed with ether and dried in air. There is obtained 90 parts (72%) of an off-white solid powder which is dissolved in acetone and reprecipitated with ether to give 30 parts (24%) of sodium 2-dicyanomethylene - 1,1,3,3 - tetracyanopropane - 1,3 - diide in the form of white granules.

*Analysis.*—Calcd. for $Na_2C_{10}N_6$: C, 48.02; H, 0.0; N, 33.61; Na, 18.39. Found: C, 47.28, 47.34; H, 0.78, 0.69; N, 31.35, 31.24; Na, 17.43.

EXAMPLE II

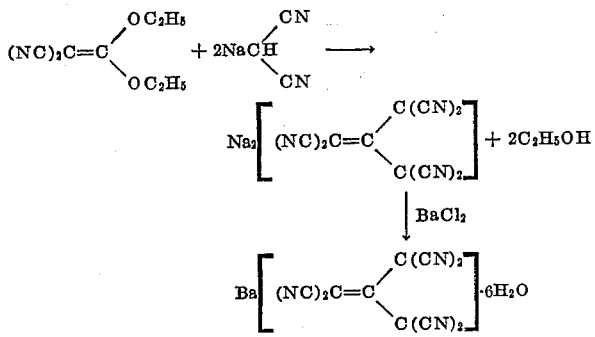

A solution of 166 parts of dicyanoketene diethyl acetal in 888 parts of tetrahydrofuran is added slowly to a solution of sodiomalononitrile prepared by dissolving 132 parts of malononitrile and 46 parts of sodium in 1970 parts of ethyl alcohol. The reaction mixture is stirred at 0° C. for 2 hours and then at room temperature for 2 hours. The resulting clear solution is poured into 21,400 parts of diethyl ether. Sodium 2-dicyanomethylene-1,1,3,3-tetracyanopropane-1,3-diide is precipitated and collected by filtration. The sodium salt is dissolved in 1000 parts of water and a solution of 250 parts of barium chloride in 1000 parts of water is added. A precipitate of 115 parts of barium 2-dicyanomethylene-1,1,3,3-tetracyanopropane-1,3-diide hexahydrate is obtained. Its identity with the product of Example III is established by the identity of their X-ray diffraction patterns.

EXAMPLE III

A solution of 10 parts of sodium 2-dicyanomethylene-1,1,3,3-tetracyanopropane-1,3-diide in 200 parts of water is mixed with 200 parts of 10% barium chloride solution. A precipitate of white needles forms. These are collected on a filter, washed with water, and recrystallized from 100 parts of water. There is obtained 10 parts of barium 2 - dicyanomethylene - 1,1,3,3 - tetracyanopropane - 1,3-diide hexhydrate in the form of long colorless needles.

*Analysis.*—Calcd. for $BaC_{10}N_4 \cdot 6H_2O$: Ba, 30.55; C, 26.71; H, 2.69; N, 18.69. Found: Ba, 30.31; C, 27.01; H, 2.79; N, 18.59, 18.89.

EXAMPLE IV

Sodium, 92 parts, is dissolved in 1970 parts absolute alcohol, and a solution of 264 parts of malononitrile in 197 parts of alcohol is added while the solution is cooled in an ice bath. A solution of 272 parts of dicyanoketene ethylene acetal in 888 parts of tetrahydrofuran is added slowly over a period of fifteen minutes to the cooled, stirred solution of sodiomalononitrile. The reaction mixture is allowed to warm slowly to room temperature. A white crystalline material deposits on the sides of the reactor, and then redissolves. The solution is stirred for three hours at room temperature, and then allowed to stand overnight. Ether is added to the solution, and the white precipitate which forms is collected on a filter, dissolved in a minimum amount of water, and mixed with a solution of 500 parts of barium chloride dihydrate in 1000 parts of warm water. The crystalline precipitate which forms after cooling is collected on a filter and recrystallized from water. There is obtained 450 parts of barium 2 - dicyanomethylene - 1,1,3,3 - tetracyanopropane-1,3-diide hexahydrate in the form of long white needles.

*Analysis.*—Calcd. for $BaC_{10}N_6 \cdot 6H_2O$: $H_2O$, 24.04. Found: $H_2O$, 22.9, 23.0.

EXAMPLE V

A solution of 225 parts of $BaC_{10}N_6 \cdot 6H_2O$ in 1980 parts of methyl alcohol is filtered, and the filtrate is allowed to evaporate under a vacuum at room temperature. There is obtained 202 parts of barium 2-dicyanomethylene-1,1,3,3-tetracyanopropane-1,3-diide trihydrate in the form of white crystals.

*Analysis.*—Calcd. for $BaC_{10}N_6 \cdot 3H_2O$: C, 30.36; H, 1.53; N, 21.25. Found: C, 30.93; H, 1.63; N, 21.64, 21.67.

EXAMPLE VI

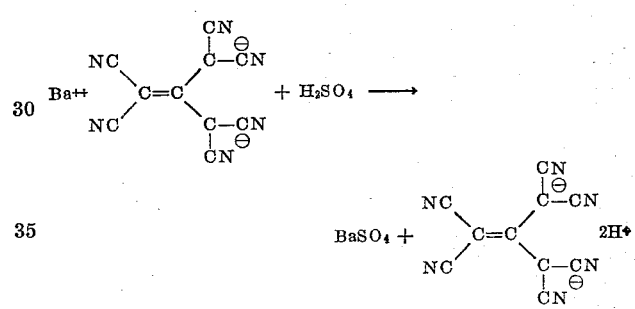

A solution of 4.4961 g. (0.01 mole) of barium 2-dicyanomethylene-1,1,3,3-tetracyanopropane-1,3-diide hexahydrate in 30 ml. of water is mixed with 50 ml. of 0.3329 normal sulfuric acid. The mixture is cooled, and the barium sulfate is removed by filtration. The filtrate is diluted with about 10 ml. of water, and a portion of the resultant solution is neutralized with 0.1029 normal sodium hydroxide, using phenolphthalein as the indicator. The solution of 2-dicyanomethylene-1,1,3,3-tetracyanopropane is determined to be 0.1986 normal by this method. Solutions of normality 0.01986 and 0.001986 are prepared from this solution by successive 1:10 dilutions.

Sulfuric acid solutions of the same normality are prepared, and the pH readings, as determined by a "Beckmann" pH meter, are compared with those of the 2-dicyanomethylene-1,1,3,3-tetracyanopropane solutions. The normality of the acids and the observed pH readings are indicated in the following tabulations:

| Acid: | pH |
|---|---|
| 0.1986 N $H_2SO_4$ | 0.80 |
| 0.1986 N $H_2C_{10}N_6$ | 0.60 |
| 0.01986 N $H_2SO_4$ | 1.80 |
| 0.01986 N $H_2C_{10}N_6$ | 1.70 |
| 0.001986 N $H_2SO_4$ | 2.70 |
| 0.001986 N $H_2C_{10}N_6$ | 2.60 |

In all cases, the aqueous solutions of $H_2C_{10}N_6$ are more strongly acidic than aqueous sulfuric acid solutions of the same normality.

The pKa of the second hydrogen of 2-dicyanomethylene-1,1,3,3-tetracyanopropane is determined from an aqueous solution prepared in this manner. The second pKa is 2.25. The first hydrogen of this acid is so strongly ionized that it is not practical to determine its pKa.

EXAMPLE VII

A solution of 225 parts of barium 2-dicyanomethylene-1,1,3,3-tetracyanopropane-1,3-diide hexahydrate in 1980 parts of methyl alcohol is mixed with a solution of 166 parts of potassium iodide in 1980 parts of methyl alcohol. The white crystalline precipitate which forms is collected on a filter and dried in the air. There is obtained 210 parts of potassium 2-dicyanomethylene-1,1,3,3-tetracyanopropane-1,3-diide.

*Analysis.*—Calcd. for $K_2C_{10}N_6$: C, 42.54; H, 0; N, 29.77; K, 27.70. Found: C, 42.65; H, 0.35; N, 30.08, 30.20; K, 27.3.

EXAMPLE VIII

A hot solution of 222 parts of aluminum sulfate ($Al_2(SO_4)_3 \cdot 18H_2O$) in 5000 parts of water is added with stirring to a hot solution of 449 parts of barium 2-dicyanomethylene-1,1,3,3-tetracyanopropane-1,3-diide in 7500 parts of water. A white precipitate of barium sulfate forms immediately. The mixture is stirred and boiled for one-half hour and then filtered. Evaporation of the filtrate yields 1050 parts of dialuminum tri-(2-dicyanomethylene - 1,1,3,3 - tetracyanopropane - 1,3 - diide) pentacosahydrate in the form of a light yellow solid.

*Analysis.*—Calcd. for $Al_2C_{30}N_{18} \cdot 25H_2O$: Al, 4.85; C, 32.20; H, 4.47; N, 22.60. Found: Al, 5.29, 5.27; C, 32.20, 31.89; H, 4.35, 4.37; N, 22.78, 22.71.

EXAMPLE IX

A hot solution of 120 parts of magnesium sulfate in 5000 parts of water is added with stirring to a hot aqueous solution of 449 parts of barium 2-dicyanomethylene-1,1,3,3-tetracyanopropane hexahydrate in 7500 parts of water. A white precipitate of barium sulfate forms immediately. The mixture is stirred and boiled for one-half hour and then filtered. Evaporation of the filtrate yields 330 parts of magnesium 2-dicyanomethylene-1,1,3,3-tetracyanopropane-1,3-diide (with 6½ moles of water of hydration) in the form of a white crystalline solid.

*Analysis.*—Calcd. for $MgC_{10}N_6 \cdot 6½H_2O$: Mg, 7.02; C, 34.80; H, 3.76; N, 24.40. Found: Mg, 6.69, 6.65; C, 34.93, 35.13; H, 3.66, 3.71; N, 24.59, 24.30.

EXAMPLE X

A hot solution of 340 parts of silver nitrate in 5000 parts of water is added with stirring to a hot solution of 449 parts of barium 2-dicyanomethylene-1,1,3,3-tetracyanopropane-1,3-diide hexahydrate in 7500 parts of water. A white precipitate of the silver salt forms immediately. After stirring and boiling for one-half hour, the mixture is filtered and the solid product is washed with 10,000 parts of boiling water. There is obtained 410 parts of silver 2-dicyanomethylene-1,1,3,3-tetracyanopropane-1,3-diide.

*Analysis.*—Calcd. for $Ag_2C_{10}N_6$: Ag, 51.4; C, 28.60; N, 20.0. Found: Ag, 51.72; C, 28.92, 28.79; N, 19.95, 19.93.

EXAMPLE XI

A hot solution of 257 parts of cadmium sulfate ($3CdSO_4 \cdot 3H_2O$) in 5000 parts of water is added with stirring to a hot solution of 449 parts of barium 2-dicyanomethylene-1,1,3,3-tetracyanopropane-1,3-diide hexahydrate in 7500 parts of water. A white precipitate of barium sulfate forms immediately. After stirring and boiling for one-half hour, the mixture is filtered. Evaporation of the filtrate yields 340 parts of cadmium 2-dicyanomethylene-1,1,3,3-tetracyanopropane-1,3-diide dihydrate in the form of white needles.

*Analysis.*—Calcd. for $CdC_{10}H_4N_6O_2$: Cd, 31.8; C, 34.2; H, 1.14; N, 23.90. Found: Cd, 31.22, 31.68; C, 34.50, 34.54; H, 1.23, 1.43; N, 23.82, 23.90.

EXAMPLE XII

A hot solution of 420 parts of uranyl sulfate ($UO_2SO_4 \cdot 3H_2O$) in 5000 parts of water is added with stirring to a hot solution of 449 parts of barium 2-dicyanomethylene- 1,1,3,3- tetracyanopropane- 1,3- diide hexahydrate in 7500 parts of water. A white precipitate of barium sulfate forms immediately. After stirring and boiling for one-half hour, the mixture is filtered. Evaporation of the filtrate yields 490 parts of uranyl 2-dicyanomethylene-1,1,3,3-tetracyanopropane-1,3-diide dihydrate.

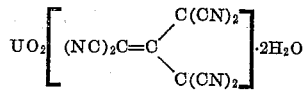

in the form of an orange solid.

*Analysis.*—Calcd. for $UC_{10}N_6O_2 \cdot 2H_2O$: U, 46.7; C, 23.5; H, 0.78; N, 16.45. Found: U, 48.22; C, 23.34; H, 1.27; N, 16.01.

EXAMPLE XIII

A solution of 25 parts of sodium 2-dicyanomethylene-1,1,3,3-tetracyanopropane-1,3-diide in 100 parts of water is acidified with dilute sulfuric acid and mixed with a solution of 30 parts of ferrous sulfate ($FeSO_4 \cdot 7H_2O$) in 200 parts of water. A light yellow solid precipitates. This material is separated by filtration and washed with 500 parts of distilled water to yield ferrous 2-dicyanomethylene-1,1,3,3-tetracyanopropane-1,3-diide (with 2½ moles of water of hydration).

*Analysis.*—Calcd. for $FeC_{10}N_6 \cdot 2½H_2O$: Fe, 18.35; C, 39.50; H, 1.64; N, 27.50. Found: Fe, 18.59, 18.55; C, 39.91, 40.08; H, 1.84, 1.79; N, 27.51, 27.60.

EXAMPLE XIV

A hot solution of 199 parts of vanadyl sulfate ($VOSO_4$) in 2000 parts of water is added with stirring to a hot solution of 449 parts of barium 2-dicyanomethylene-1,1,3,3-tetracyanopropane-1,3-diide hexahydrate in 7500 parts of water. A white precipitate of barium sulfate forms immediately. After stirring and boiling for one-half hour, the mixture is filtered. Evaporation of the filtrate yields 300 parts of vanadyl 2-dicyanomethylene-1,1,3,3-tetracyanopropane-1,3-diide with 3½ moles of water of hydration

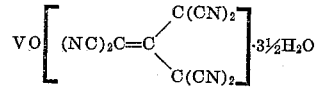

in the form of a green solid.

*Analysis.*—Calcd. for $VC_{10}N_6O \cdot 3½H_2O$: V, 15.30; C, 36.00; H, 2.10; N, 25.10. Found: V, 16.20, 16.25; C, 36.18, 35.90; H, 2.15, 1.73; N, 24.26, 24.80.

EXAMPLE XV

A hot solution of 250 parts of cupric sulfate ($CuSO_4 \cdot 5H_2O$) in 6000 parts of water is added to a hot solution of 449 parts of barium 2-dicyanomethylene-1,1,3,3-tetracyanopropane-1,3-diide hexahydrate in 7500 parts of water. A grey precipitate forms immediately. The mixture is stirred and boiled for one-half hour and filtered. Evaporation of the filtrate yields 400 parts of lustrous black crystals of cupric 2-dicyanomethylene-1,1,3,3-tetracyanopropane-1,3-diide hemihydrate.

*Analysis.*—Calcd. for CuC$_{10}$N$_6$·½H$_2$O: Cu, 23.0; C, 43.5; H, 0.36; N, 30.05. Found: Cu, 22.75; C, 43.27; H, 0.86; N, 29.32.

Cupric 2-dicyanomethylene-1,1,3,3-tetracyanopropane-1,3-diide is also obtained as a precipitate when an aqueous solution of sodium 2-dicyanomethylene-1,1,3,3-tetracyanopropane-1,3-diide is mixed with an aqueous solution of copper sulfate or copper nitrate.

The product is useful as a pigment. Cupric 2-dicyanomethylene-1,1,3,3-tetracyanopropane-1,3-diide may be dispersed in any conventional coating composition vehicle in the preparation of an enamel, printing ink or the like. Suitable vehicles include linseed oil, alkyd resin solutions and solutions of nitrocellulose. For example, when the pigment is dispersed in an alkyd resin solution a maroon colored enamel is formed. A dried film of this enamel is superior in Fade-O-Meter lightfastness to a similar enamel pigmented with copper potassium ferrocyanide.

EXAMPLE XVI

A hot solution of 263 parts of nickelous sulfate (NiSO$_4$·6H$_2$O) in 5000 parts of water is added with stirring to a hot solution of 449 parts of barium 2-dicyanomethylene- 1,1,3,3- tetracyanopropane- 1,3- diide hexahydrate in 6000 parts of water. The green precipitate which forms immediately is a mixture of barium sulfate and nickelous 2-dicyanomethylene-1,1,3,3-tetracyanopropane-1,3-diide tetrahydrate which is only sparingly soluble in water. The mixture is stirred and boiled for one-half hour and then filtered. Evaporation of the filtrate yields an additional quantity of nickelous 2-dicyanomethylene-1,1,3,3-tetracyanopropane-1,3-diide tetrahydrate in the form of green crystals.

*Analysis.*—Calcd. for NiC$_{10}$N$_6$·4H$_2$O: Ni, 17.5; C, 35.9; H, 2.39; N, 25.20. Found: Ni, 17.16, 17.16; C, 39.53, 39.16; H, 2.01, 2.16; N, 26.25, 26.29.

EXAMPLE XVII

A solution of 2500 parts of sodium 2-dicyanomethylene-1,1,3,3-tetracyanopropane-1,3-diide in 10,000 parts of water is acidified with dilute sulfuric acid and then added to a solution of 1405 parts of cobaltous sulfate in 5000 parts of water. An orange solid slowly crystallizes out. This material is separated by filtration and washed with distilled water to yield 1350 parts of cobaltous 2-dicyanomethylene-1,1,3,3-tetracyanopropane-1,3-diide dihydrate.

*Analysis.*—Calcd. for CoC$_{10}$N$_6$·2H$_2$O: Co, 20.0; C, 40.00; H, 1.34; N, 27.80. Found: Co, 19.45, 19.58; C, 40.23, 40.14; H, 1.77, 1.47; N, 27.60, 27.37.

EXAMPLE XVIII

A hot solution of 54 parts of strontium chloride (SrCl$_2$·6H$_2$O) in 250 parts of water is mixed with a hot solution of 50 parts of sodium 2-dicyanomethylene-1,1,3,3-tetracyanopropane-1,3-diide in 250 parts of water. On cooling, white needles crystallize out. Recrystallization of this crystalline precipitate from water yields 30 parts of strontium 2-dicyanomethylene-1,1,3,3-tetracyanopropane-1,3-diide heptahydrate.

*Analysis.*—Calcd. for SrC$_{10}$N$_6$·7H$_2$O: Sr, 20.2; C, 28.8; N, 20.2; H, 3.36. Found: Sr, 20.6; C, 28.17, 28.34; N, 21.43, 21.43; H, 3.19, 3.17.

EXAMPLE XIX

A hot solution of 287 parts of zinc sulfate (ZnSO$_4$·7H$_2$O)

in 5000 parts of water is added with stirring to a hot solution of 449 parts of barium 2-dicyanomethylene-1,1,3,3-tetracyanopropane-1,3-diide hexahydrate in 7500 parts of water. A white precipitate forms immediately. The mixture is boiled and stirred for one-half hour. The mixture is then filtered and the filtrate set aside to evaporate. White crystals slowly form and there is obtained 280 parts of zinc 2-dicyanomethylene-1,1,3,3-tetracyanopropane-1,3-diide containing 2½ moles of water of hydration.

*Analysis.*—Calcd. for ZnC$_{10}$N$_6$·2½H$_2$O: Zn, 20.8; C, 38.3; N, 26.8; H, 1.59. Found: Zn, 19.48; C, 38.63, 38.65; N, 27.14, 27.02; H, 1.43, 1.44.

EXAMPLE XX

A hot solution of 169 parts of manganous sulfate (MnSO$_4$·H$_2$O) in 5000 parts of water is added with stirring to a hot solution of 449 parts of barium 2-dicyanomethylene - 1,1,3,3 - tetracyanopropane - 1,3 - diide hexahydrate in 7500 parts of water. A white precipitate of barium sulfate forms immediately. After stirring and boiling for one-half hour, the mixture is filtered and the filtrate set aside to evaporate. White crystals slowly form and there is obtained 210 parts of manganous 2-dicyanomethylene-1,1,3,3-tetracyanopropane-1,3-diide dihydrate.

*Analysis.*—Calcd. for MnC$_{10}$N$_6$·2H$_2$O: Mn, 18.6; C, 40.8; N, 28.6; H, 1.36. Found: Mn, 16.41; C, 41.18; N, 28.93; H, 1.04.

EXAMPLE XXI

A hot solution of 319 parts of mercuric acetate in 5000 parts of water is added with stirring to a hot solution of 449 parts of barium 2-dicyanomethylene-1,1,3,3-tetracyanopropane-1,3-diide hexahydrate in 7500 parts of water. A yellow solid slowly precipitates. After stirring and boiling for fifteen minutes, the reaction mixture is filtered and the solid product washed with hot distilled water. There is obtained 200 parts of mercuric 2-dicyanomethylene-1,1,3,3-tetracyanopropane-1,3-diide.

*Analysis.*—Calcd. for HgC$_{10}$N$_6$: Hg, 49.5; C, 29.7; N, 20.8. Found: Hg, 50.12; C, 27.66; N, 18.12.

EXAMPLE XXII

A hot solution of 132 parts of ammonium sulfate in 2000 parts of water is added with stirring to a hot solution of 449 parts of barium 2-dicyanomethylene-1,1,3,3-tetracyanopropane-1,3-diide hexahydrate in 7500 parts of water. A white precipitate of barium sulfate forms immediately. After stirring and boiling for one-half hour, the mixture is filtered. Evaporation of the filtrate yields 230 parts of diammonium 2-dicyanomethylene-1,1,3,3-tetracyanopropane-1,3-diide in the form of white crystals.

*Analysis.*—Calcd. for C$_{10}$H$_8$N$_8$: C, 50; H, 3.3; N, 46.7. Found: C, 50.15, 49.81; H, 3.20, 3.41; N, 46.28, 46.79.

EXAMPLE XXIII

A hot solution of 284 parts of aniline sulfate in 5000 parts of water is added with stirring to a hot solution of 449 parts of barium 2-dicyanomethylene-1,1,3,3-tetracyanopropane-1,3-diide hexahydrate in 7500 parts of water. A white precipitate of barium sulfate forms immediately. After stirring and boiling for one-half hour, the mixture is filtered. Evaporation of the filtrate yields 380 parts of white crystalline dianilinium 2-dicyanomethylene-1,1,3,3-tetracyanopropane-1,3-diide.

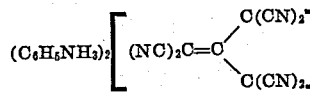

*Analysis.*—Calcd. for $C_{22}H_{16}N_8$: C, 67.43; H, 4.07; N, 28.50. Found: C, 67.48, 67.46; H, 4.35, 4.13; N, 28.46, 27.47.

EXAMPLE XXIV

To a solution of 20.47 parts of 2-dicyanomethylene-1,1,3,3-tetracyanopropane in 1000 parts of water is added 50 parts of quinoline and 1023 parts of 5% aqueous hydrochloric acid. The resulting solution is allowed to stand for ten minutes at room temperature and then cooled. The orange precipitate which forms is collected on a filter. It is recrystallized from water after purification with activated carbon to give 60 parts of diquinolinium 2-dicyanomethylene-1,1,3,3-tetracyanopropane-1,3 - diide in the form of light yellow needles, M. P. 206–208° C.

*Analysis.*—Calcd. for $C_{28}H_{16}N_8$: C, 72.40; H, 3.47; N, 24.13. Found: C, 72.53; H, 3.62; N, 24.12, 24.13.

EXAMPLE XXV

A solution of 50 parts of sodium 2-dicyanomethylene-1,1,3,3-tetracyanopropane-1,3-diide in 500 parts of water is added to a solution of 125 parts of tetra-n-propylammonium iodide in 100 parts of water. A white crystalline product precipitates. Recrystallization of this solid from 3000 parts of hot ethyl alcohol yields 40 parts of di(tetra-n-propylammonium) 2 - dicyanomethylene - 1,1,3,3-tetracyanopropane-1,3-diide which melts at 296–298° C.

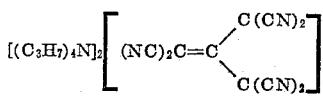

*Analysis.*—Calcd. for $C_{34}H_{56}N_8$: C, 70.60; H, 9.70; N, 19.40. Found: C, 70.05, 70.12; H, 9.50, 9.43; N, 19.45, 19.27.

EXAMPLE XXVI

A solution of 50 parts of sodium 2-dicyanomethylene-1,1,3,3-tetracyanopropane-1,3-diide in 500 parts of water is added to a solution of 148 parts of tetra-n-butylammonium iodide in 3000 parts of water. An oil separates and slowly crystallizes. Recrystallization of this solid from 500 parts of hot ethyl alcohol yields white crystals of di(tetra - n - butylammonium) 2 - dicyanomethylene-1,1,3,3-tetracyanopropane-1,3-diide.

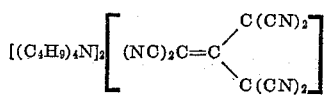

*Analysis.*—Calcd. for $C_{42}H_{72}N_8$: C, 73.0; H, 10.45; N, 16.30. Found: C, 72.58, 72.60; H, 10.62, 10.45; N, 15.48, 15.61.

When trimethylsulfonium iodide is substituted for tetra-n-butylammonium iodide in this example, di-(trimethylsulfonium) 2-dicyanomethylene-1,1,3,3-tetracyanopropane diide is obtained.

EXAMPLE XXVII

A solution of sodiomalononitrile is prepared by dissolving 92 parts of sodium in 3950 parts of ethyl alcohol and adding a solution of 264 parts of malononitrile in 1970 parts of ethyl alcohol. The mixture is cooled to 0° C. and a solution of 340 parts of dicyanoketene dimethylthioacetal (prepared as disclosed by Edwards and Kendall in U. S. Patent No. 2,533,233) is added. The resulting solution is stirred at 0° C. for one hour and then for six hours at room temperature. The solvents are removed by evaporation, leaving a residue of 700 parts of solid sodium 2 - dicyanomethylene - 1,1,3,3-tetracyanopropane-1,3-diide. This product is dissolved in 20,000 parts of distilled water and acidified with aqueous hydrochloric acid. A solution of 700 parts of barium chloride in 2000 parts of water is added and the mixture is brought to a boil. On cooling to 0° C., 810 parts of barium 2-dicyanomethylene-1,1,3,3-tetracyanopropane-1,3-diide hexahydrate crystallizes out. The identity of this material with the product of Example III is established by the identity of their X-ray diffraction patterns and infrared absorption spectra.

The process of the present invention is generic to the reaction of two moles of sodiomalononitrile with one mole of a dicyanoketene acetal. This reaction is exothermic and it is convenient, though not essential, to provide for dissipation of the heat of reaction by operating in the presence of an inert liquid medium. Since an alcohol is formed as a by-product in this reaction, the preferred liquid media comprise the alcohols, particularly methanol, ethanol, n-propyl alcohol, isopropyl alcohol, the butanols, ethylene glycol, glycerine, and the like. Other suitable reaction media are the ethers such as dimethyl ether, diethyl ether, diisopropyl ether, and the like, cyclic ethers such as tetrahydrofuran and dioxane, ketones such as acetone, and liquid hydrocarbons such as pentane, hexane, cyclohexane, cyclohexene, benzene, toluene, the xylenes, and the like.

The temperature at which the reaction of this invention takes place may be varied within wide limits. For example, by using a high boiling solvent or by operating in a closed system under pressure, temperatures in the range of 100–200° C. may be employed. Similarly, by using a medium with a low freezing point, temperatures below 0° C. may be used. However, for practical purposes, it is best to operate below the normal boiling point of the reaction medium at temperatures between 0° and 100° C., and particularly temperatures between 0° and 50° C.

Dicyanoketene acetals (or thioacetals) in general may be used interchangeably as starting materials in the present invention since the acetal structure disappears in the course of the reaction. Thus, dicyanoketene dimethyl acetal, dicyanoketene diethyl acetal, dicyanoketene ethylene acetal, dicyanoketene trimethylene acetal, 2-dicyanomethylene-4-methyl-1,3-dioxolane and their sulfur analogs may be employed.

2-dicyanomethylene-1,1,3,3-tetracyanopropane may be converted to its salts by reaction with a metal or with the hydroxide or carbonate of the desired cation. Thus, calcium 2-dicyanomethylene-1,1,3,3-tetracyanopropane-1,3-diide may be obtained by reacting the acid with calcium hydroxide or calcium carbonate. As illustrated in the foregoing examples, the soluble barium salt of 2-dicyanomethylene-1,1,3,3-tetracyanopropane can readily be prepared by metathesis of the sodium salt, and this barium salt is particularly useful as an intermediate for preparing other salts by further metathesis with soluble sulfates since the by-product, barium sulfate, precipitates out and is readily removed. Amine salts readily react with the acid or its inorganic salts to give amine salts of the acid.

2 - dicyanomethylene - 1,1,3,3 - tetracyanopropane and its salts cause the precipitation of gelatin from aqueous solution. Thus, the free acid and its salts are useful as hardeners for photographic emulsions. They are also highly useful as tanning agents for leather.

The salts of the present invention become luminescent under ultraviolet light and when exposed to cathode rays. This latter property makes these compounds particularly useful as phosphors for television tubes. These effects may be observed by visual examination of the appearance of a powdered sample of the salt under ultraviolet light of various wave lengths and by examining it under the influence of cathode rays in an evacuated space as in a television picture tube. Observations of this sort are shown in the following table which includes data showing that corresponding salts of the known 1,1,3,3-tetracyanopropane do not possess these properties.

Table

| Salt | Luminescence | | |
|---|---|---|---|
| | U. V. (2537 A.) | U. V. (3650 A.) | Cathode Rays |
| Ba[(NC)$_2$C=C(C(CN)$_2$)(C(CN)$_2$)]·6H$_2$O | cream-white | cream-white | blue-green. |
| Zn[(NC)$_2$C=C(C(CN)$_2$)(C(CN)$_2$)]·2½H$_2$O | blue-green | light blue | light blue. |
| Sr[(NC)$_2$C=C(C(CN)$_2$)(C(CN)$_2$)]·7H$_2$O | cream-white | pink | blue-green. |
| K$_2$[(NC)$_2$C=C(C(CN)$_2$)(C(CN)$_2$)] | pink-yellow | tan-yellow | tan-yellow. |
| Ba[(NC)$_2$C=CH—C(CN)$_2$]$_2$ | (none) | (none) | (none). |
| Zn[(NC)$_2$C=CH—C(CN)$_2$]$_2$ | (none) | (none) | (none). |

Since many different embodiments of the invention may be made without departing from the spirit and scope thereof, it is to be understood that the invention is not limited by the specific illustrations except to the extent defined in the following claims.

What is claimed is:
1. A compound of the formula

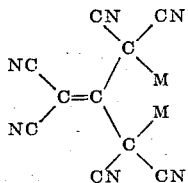

where M is selected from the group consisting of hydrogen, inorganic cations, amine cations and sulfonium cations, including a single cation representing both M's taken together.

2. 2-dicynomethylene-1,1,3,3-tetracyanopropane.
3. A 2-dicyanomethylene-1,1,3,3-tetracyanopropane-1,3-diide salt.
4. A metal salt of 2-dicyanomethylene-1,1,3,3-tetracyanopropane.
5. A trialkylsulfonium salt of 2-dicyanomethylene-1,1,3,3-tetracyanopropane.
6. A salt of 2-dicyanomethylene-1,1,3,3-tetracyanopropane and an amine.
7. The process for preparing a salt of 2-dicyanomethylene-1,1,3,3-tetracyanopropane which comprises reacting a dicyanoketone acetal with two molecular equivalents of sodiomalononitrile, said acetal having the formula (NC)$_2$C=C(ZR)$_2$ where Z represents a chalcogen of atomic weight less than 33 and R represents an alkyl radical, both R's being taken together to represent a bivalent hydrocarbon radical in the case of a cyclic acetal.

8. The process which comprises mixing a dicyanoketene acetal and sodiomalononitrile in an inert organic liquid medium until two molecular equivalents of metalomalononitrile have reacted with dicyanoketene acetal, and isolating the 2 - dicyanomethylene - 1,1,3,3-tetracyanopropane formed as a 1,3-diide salt.

9. The process which comprises mixing a dicyanoketene acetal and a sodiomalononitrile in an inert organic liquid medium until two molecular equivalents of sodiomalononitrile have reacted with dicyanoketene acetal to form sodium 2 - dicyanomethylene-1,1,3,3-tetracyanopropane-1,3-diide, by metathesis replacing the sodium cation of this salt with a different cation, and isolating the 2-dicyanomethylene-1,1,3,3-tetracyanopropane-1,3-diide salt.

10. A process as defined in claim 9 in which the 2-dicyanomethylene-1,1,3,3-tetracyanopropane-1,3-diide is a water-soluble salt of a polyvalent metal and is purified by crystallization from water in the form of a hydrate.

11. The process which comprises treating an aqueous solution of a metal salt of 2-dicyanomethylene-1,1,3,3-tetracyanopropane, formed by reacting a dicyanoketene acetal with two molecular equivalents of sodiomalononitrile, with an anion which removes the metal cation as an insoluble compound.

References Cited in the file of this patent

UNITED STATES PATENTS

| | | |
|---|---|---|
| 2,398,757 | Loder et al. | Apr. 16, 1946 |
| 2,541,350 | Gilbert | Feb. 13, 1951 |
| 2,541,351 | Gilbert | Feb. 13, 1951 |
| 2,721,799 | Edwards et al. | Oct. 25, 1955 |